(12) United States Patent
Dellmann

(10) Patent No.: US 7,204,671 B2
(45) Date of Patent: Apr. 17, 2007

(54) FLUID FLOW ENGINE

(75) Inventor: Udo Dellmann, Lohnsfeld (DE)

(73) Assignee: BorgWarner Inc., Auburn Hills, MI (US)

( * ) Notice: Subject to any disclaimer, the term of this patent is extended or adjusted under 35 U.S.C. 154(b) by 162 days.

(21) Appl. No.: 11/025,705

(22) Filed: Dec. 29, 2004

(65) Prior Publication Data

US 2007/0059157 A1 Mar. 15, 2007

(30) Foreign Application Priority Data

Jan. 2, 2004 (EP) .................................. 04000001

(51) Int. Cl.
*F04D 29/056* (2006.01)
*F04D 29/66* (2006.01)
(52) U.S. Cl. ...................... 415/111; 415/119; 60/605.3
(58) Field of Classification Search ............... 415/112, 415/111, 110, 142, 229; 60/605.3
See application file for complete search history.

(56) References Cited

U.S. PATENT DOCUMENTS

| | | | | |
|---|---|---|---|---|
| 4,358,253 A | * | 11/1982 | Okano et al. ............... | 417/407 |
| 4,427,309 A | * | 1/1984 | Blake ......................... | 384/901 |
| 4,902,144 A | * | 2/1990 | Thoren ....................... | 384/901 |
| 6,899,531 B2 | * | 5/2005 | Hummel ..................... | 415/119 |

* cited by examiner

*Primary Examiner*—Richard A. Edgar
(74) *Attorney, Agent, or Firm*—Akerman Senterfitt; Greg Dziegielewski

(57) ABSTRACT

A fluid flow engine comprises a shaft supported in a bearing housing by means of a bearing shell. There are at least two lubricating bores in the bearing shell each having a predetermined geometry as to diameter, length and angular arrangement with respect to the bearing shell. At least one turbine rotor is on one end of the shaft. A turbine housing provides a turbine space for accommodating the turbine rotor, the turbine housing being connected to the bearing housing. There are sound suppressing means arranged within the bearing housing.

10 Claims, 4 Drawing Sheets

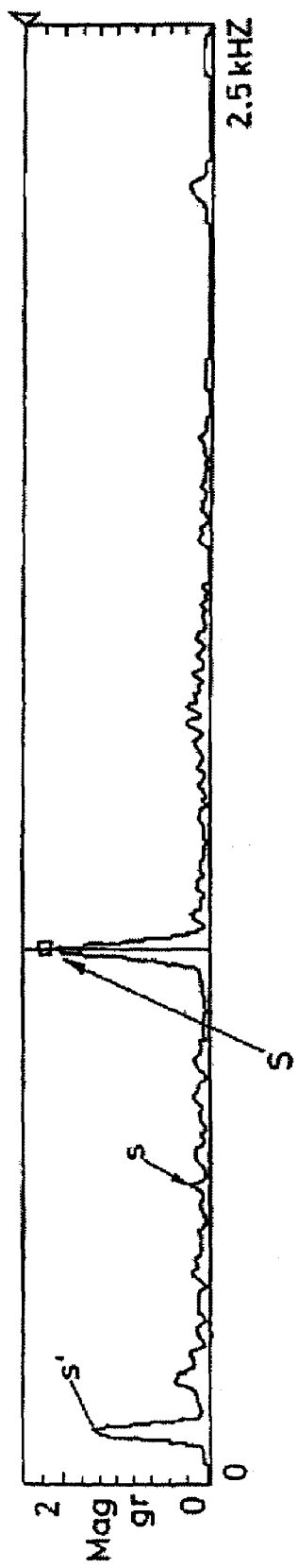
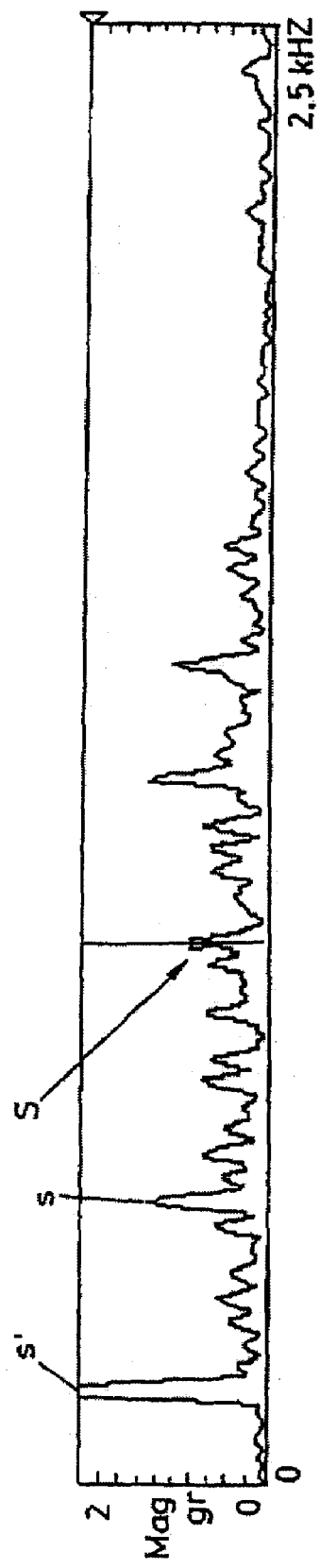

FLUID FLOW ENGINE

BACKGROUND OF THE INVENTION

1. Field of the Invention

The present invention relates generally to a fluid flow engine comprising a shaft, a bearing housing for supporting the shaft lubricated through at least two lubricating bores, which lead to at least one shaft bearing shell. The lubricating bores present a predetermined geometry with respect to diameter, length and angular arrangement. There is further a turbine housing for accommodating a turbine wheel mounted on the shaft and rotating in a turbine space of the turbine housing which is attached to the bearing housing.

If the term "fluid flow engine" is used in the context of the present description, it should either mean a turbine or a secondary air pump or the like. Preferably, it is a turbocharger.

2. Related Art of the Invention

The problem of the development of noise in fluid flow engines is known. Correspondingly, a variety of suggestions have been made for muffling this noise. Muffling arrangements have partially been provided on or around the blades of a rotor, as disclosed in U.S. Pat. Nos. 5,110,258; 5,173,020; 5,820,348 and 6,309,176 or in EP-0 039 459. Other suggestions get at providing mufflers at the flow entrance or flow exit of a bladed rotor. Examples may be found in U.S. Pat. Nos. 3,578,107; 4,204,586 and 4,969,536 or in EP-0 573 895.

All these measures result in a decrease in development of noise, but there is still some noise remaining whose origin is not always clear.

SUMMARY OF THE INVENTION

Just this remaining noise and its origin have been investigated in depth by the present inventors after eliminating all other sources of noise. Surprisingly, it has been found, and this was a first step in direction toward the invention, that part of the noise emitted by a fluid flow engine has its origin in the shaft bearings. This was surprising, because one supposed up to now that a shaft bearing has nothing to do than to enable a shaft to rotate in a quiet and uniform manner.

When this phenomenon was continued to be investigated, the surprise was still greater, because it was found that it was a cooperation of the bearing and the lubricating system which caused the noise. The lubricating system comprises, in general, at least two, but often more, lubricating bores which lead to the bearing shell in a general star-like configuration. Each one of these bores contains, of course, a lubricating agent, and it has been found that it were the half-frequency turbulences generated in the oil film which produced an oscillation incitation of the bearing shell and, thus, some noise, but in addition (without wishing to be bound to this theory) causing probably the column of fluid (lubricating agent) contained in each of the lubricating bores of a certain length and thickness (and geometrical arrangement relative to the bearing) to oscillate during operation of the fluid flow engine.

As soon as these two steps of recognition had been performed, only a further step was necessary to conceive the invention completely, which consists substantially in that a muffler arrangement is provided within the bearing housing, particularly on the shaft bearing shell. The term "on the shaft bearing shell", as used herein, should be understood in its broadest sense, i.e. encompassing both an arrangement within the shaft bearing shell and within the bearing housing and around the shaft bearing shell.

In principle, the muffler arrangement may be of any kind known per se, for example using sound absorbent means, interference arrangements and/or Helmholtz arrangements. However, it has been found to be the simplest way of realization and the most efficient one, if the muffler arrangement comprises at least two lubricating bores of a different geometry. The term "geometry" has already been defined above as dimensioning and arranging the bore's diameter, length and annular arrangement (with respect to the shaft bearing shell).

Particularly favorable results have been obtained, if at least two of the lubricating bores have a different geometry with respect to the bearing shell. It has been found that this measure results in two effects: since the half-frequency turbulences can no longer generate a uniform incitation, but are disturbed again and again during each revolution of the shaft due to the varying geometry, the fluid columns in the bores can no longer oscillate with the same frequency, and this reduces the development of noise still further.

Such differing geometry may be realized, of course, in a variety of ways, for example by narrowing the interior portion of the lubricating bore in the bearing shell in comparison with the orifice of the lubricating conduit attached to the outer surface of the bearing shell, so that the bore has a larger diameter at the radial outside than radial inside the bearing shell. However, this entrains some expensive treatment of the parts, for which reason at least one of the following possibilities are preferred:

at least one of the lubricating bores has a different diameter as compared with the at least second lubricating bore;

at least one of the lubricating bores orifices into the interior of the bearing shell under a different angle and/or has a different length as compared with the other bore(s);

the lubricating bores are distributed over the circumference of the bearing shell under different circumferential angles.

It will be understood that these measures mentioned above can also be combined.

BRIEF DESCRIPTION OF THE DRAWINGS

Further details of the invention will become apparent from the following description of embodiments schematically illustrated in the drawings, in which:

FIG. 7 a plot of an acceleration spectrum in a traditional embodiment having rotationally symmetrically arranged and uniformly dimensioned lubricating bores; and FIG. 8 a plot of an acceleration spectrum in an embodiment according to the invention, as shown in FIG. 2.

DETAILED DESCRIPTION OF THE INVENTION

Figure 1:
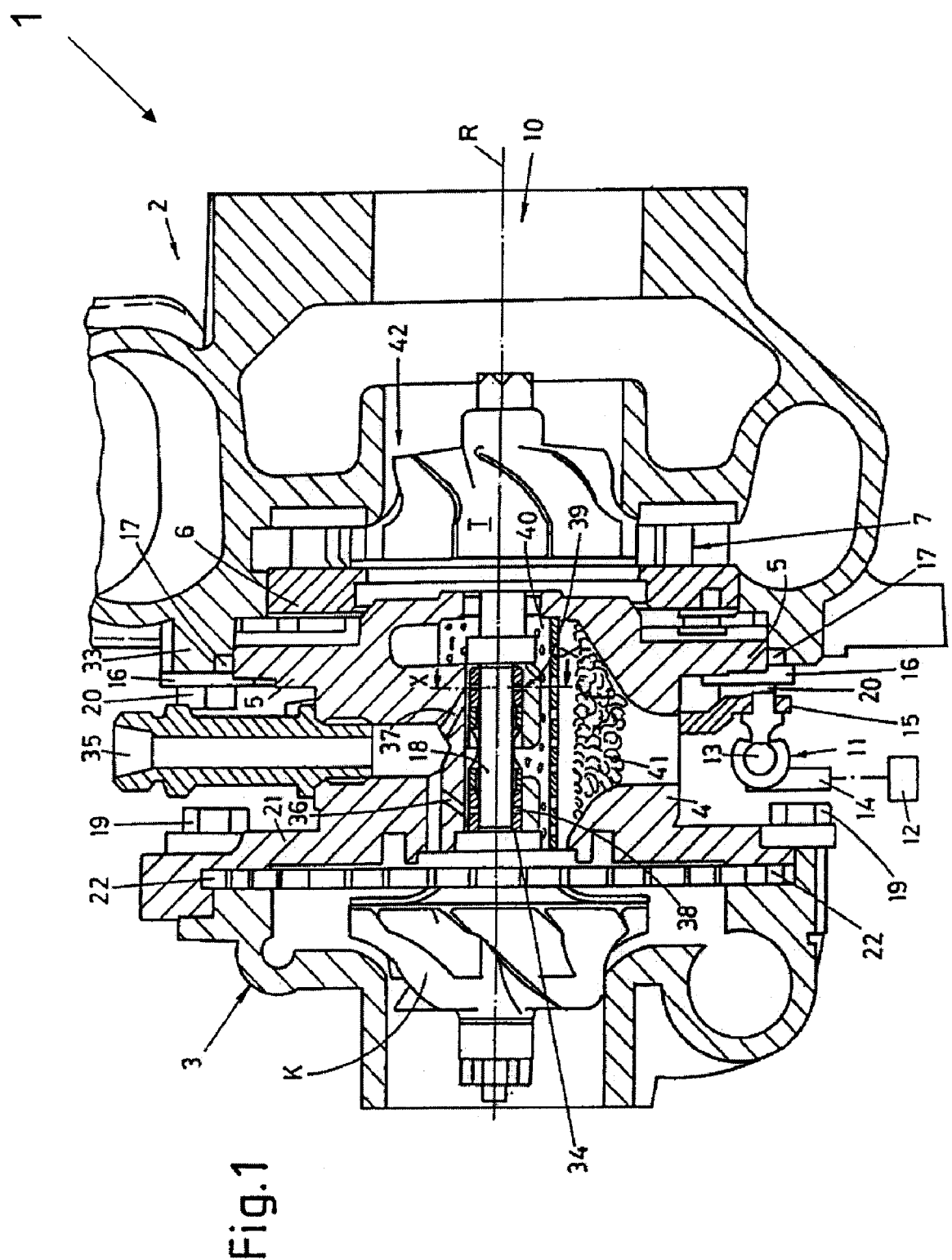
FIG. 1 is an axial cross-section of a housing arrangement of a turbocharger according to the invention.

According to FIG. 1, a turbocharger 1 comprises, as usual, a turbine housing part 2, a bearing housing part 4 and a compressor housing part 3 attached to the turbine housing part 2. All these parts 2–4 are arranged along a longitudinal axis of rotation R, and a shaft 18 extends along this axis R. At each end of the shaft 18, a rotor is mounted, i.e. a turbine rotor T at one end inside the turbine housing 2 within a turbine space 42, and a compressor rotor K accommodated in the compressor housing 3 at the other end.

The bearing housing 4 is fastened to the compressor housing 3 by means of threaded bolts 19 around the longitudinal axis R, and by threaded bolts 20 in an opening formed by a wall 33 to the turbine housing 2. Between a mounting flange 21 of the bearing housing 4 and the compressor housing 3 is a sealing ring 22 which, however, may be of traditional nature due to the relative low temperatures prevailing in this region.

The turbine housing part 2 contains a nozzle ring 6 of a guiding grid of variable geometry known per se, which comprises guiding vanes 7 distributed over its circumference. The guiding vanes 7 can be rotated about associated pivot axles or pivot shafts (depending on the adjustment mechanism) so that they form nozzle cross-sections between each other which, according to the pivot position of the guiding vanes 7, i.e. more radial or more tangential relative to the axis R, are larger or smaller, thus supplying more or less waste gas of a combustion engine to the turbine rotor T situated in the center at the axis R. The waste gas is then discharged via a central pipe 10. In this way, the turbine rotor T drives a compressor rotor K mounted on the same shaft 18. The mechanism for turning the guiding vanes 7 may be of any type desired. In general, there will be a control device 12 from which control movements of a membrane therein (for sensing a fluid pressure) are transmitted to a tappet member 14. The tappet member 14 comprises a crowned bearing 11 which is engaged by a crank pin 13 of a crank lever 15. The crank lever 15 is connected, as is known per se, to an adjustment shaft which, in the illustration of FIG. 1, is in a different plane and, therefore, is not visible in this figure. From this shaft, the control movement is transferred to the pivot shafts by means of levers mounted on the pivot shafts, or by means of toothed sectors or in any other way according to the prior art. The shaft 18 is of known nature and may be supported in any way within the bearing housing 4, the bearing construction itself being of no importance for the present invention.

The bearing housing 4 ends, in the direction towards the turbine housing 2, in an end flange 5 which is inserted into a corresponding recess of the turbine housing 2 prior to interconnecting both housing parts 2, 4 by the threaded bolts 20. A holding ring, or simply a washer 16 for the threaded bolts 20 may either be screwed onto the flange 5 or may be integrally cast with the flange 5. This holding ring 16 holds firmly a sealing ring 17 having about square cross-section and being inserted into a correspondingly quadriform groove of the turbine housing 2. The holding ring 16 may, however, serve in addition to mounting the bearing housing part 4 to the turbine housing part 2, thus fixing and determining the axial position of the bearing housing 4 relative to the turbine housing 2.

A bearing shell 34 for supporting the shaft 18 is accommodated within the bearing housing 4. This bearing shell 34 receives a lubricating agent through a central lubricating nipple 35. The lubricating agent flowing from the lubricating nipple 35 to the bearing shell 34 is distributed from bores 36 and 37 to radial bores 38 and 39 of the bearing shell 34 at that end of the lubricating nipple 35, which faces the bearing shell 34, thus forming an oil film between the inner wall of the bearing shell 34 and the outer surface of the shaft 18. Now, it has been found that this oil film causes noise which is emitted by the bearing housing 4. This is due to the fact that, with the rotation of the shaft 18 that supports the rotors K and T, half-frequency turbulences are developing within the oil film which incite the bearings to oscillation, and generate noise.

One possibility at least to reduce this noise, if not to eliminate it, resides in the use of customary mufflers, such as a perforated Helmholtz plate 40 mounted around the bearing shell 34 and forming, together with the bearing housing part 4 itself, a Helmholtz muffler. To this end, sound absorbing material 41 may also or instead be accommodated within the bearing housing 4 rather than in one of the housing parts 2 and 3 of the rotors T and K. However, a particularly effective arrangement for suppressing sound and noise will now be described with reference to the following figures.

Figure 2:
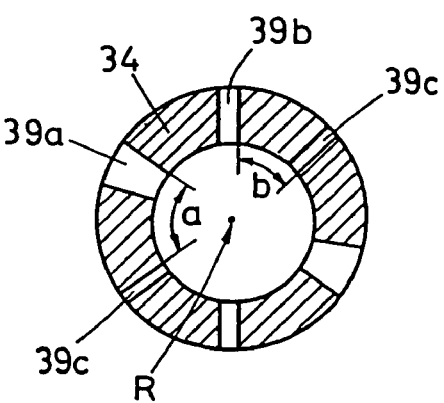
FIG. 2 a first preferred embodiment shown in an enlarged cross-sectional view according to the line X—X of FIG. 1.

In the case of the embodiment of FIG. 2, lubricating bores 39a, 39b and 39c of different diameters are arranged at uniform angular distances around the axis of rotation R, and are supplied, as is known per se, with lubricating agent through the lubricating bore 37 (FIG. 1). Due to the fact that the diameters of the bores 39a to 39c are different, the angular distance a from the boundary wall of the lubricating bore 39c to the corresponding boundary wall of the lubricating bore 39a differs from the angular distance b between the boundary walls of the lubricating bores 39b and 39c. The same applies to the angular distance between the bores 39a and 39b, not specially marked in the figure. In this way, no distinctive half-frequency turbulence can develop, and the noise, which would otherwise be generated, is therefore reduced. An additional effect is that each one of the lubricating bores 39a, 39b and 39c (considered as a fluid column incited to oscillate by the half-frequency turbulence of the oil film between the inner wall of the bearing shell 34 and the outer surface of the shaft 18) has a different characterizing frequency.

Figure 3:
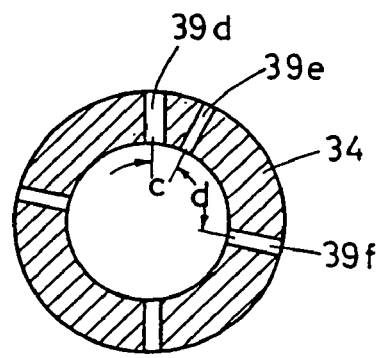
FIG. 3 a second preferred embodiment shown in an enlarged cross-sectional view according to the line X—X of FIG. 1.

Another preferred constructional possibility, having about the same effect, may be seen in FIG. 3 where lubricating bores 39d, 39e and 39f are arranged at different angular distances c and d which produces about the same or a similar effect, as has been discussed above. However, it will be understood that the invention is not restricted to a particular number of lubricating bores, because any number of bores may be used, but at least two of them.

Figure 4:
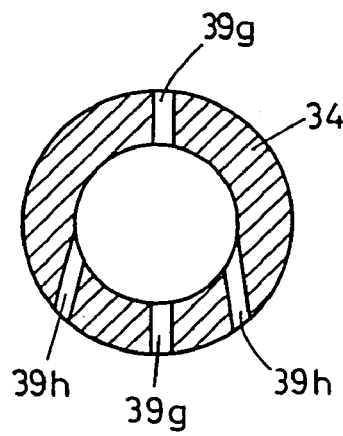
FIG. 4 a third preferred embodiment shown in an enlarged cross-sectional view according to the line X—X of FIG. 1.

In the case of the embodiment of FIG. 4, not only the angular distances between the orifices of the bores 39g and 39h are different, but also the junction angle. Furthermore, while the bores 39g discharge about in radial direction into the interior of the bearing shell 34, the lubricating bores 39h discharge almost tangentially into the bearing shell 34, which means that the effects of the half-frequency turbulence of the oil film to the discharge orifices of the bores 39g, on the one hand, and the bores 39h, on the other hand, will be different. In addition, the length of the lubricating bores 39h will be somewhat larger than the length of the bores 39g, which enter the interior of the bearing shell 34 about in radial direction, so that the characterizing frequency or the respective fluid in the bores 39g and 39h will be different, and partial noise extinction will occur.

It will be understood that the constructional possibilities shown in FIGS. 2 to 4 cannot only combined among one another, but can also be altered in a variety of manners, considering the fact that it is the sense of these measures to make the geometry, which influences sound, different for different lubricating bores 39 (at least two). As will be shown below, when comparing FIGS. 5 and 6, the disturbing noise of the prior art can be suppressed to a large extend, even if additional measures, as have been shown in FIG. 1 (Helmholtz plate 40 and sound absorbing mass 41) are not provided. Nevertheless, some additional sound absorbing measures known in the art may be provided within the scope of the invention, as was unknown up to now in bearing housings 4.

Figure 5:
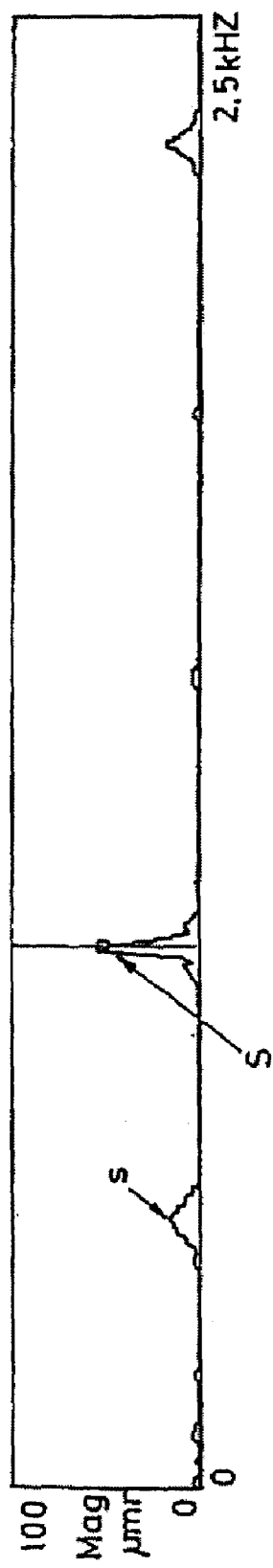
FIG. 5 a plot of an amplitude spectrum in a traditional embodiment having rotationally symmetrically arranged and uniformly dimensioned lubricating bores.

FIG. 5 shows a diagram in which frequency in kHz is plotted on the abscissa, while amplitudes of the wave excursion in μm are on the ordinate (the indication "μmr" refers to the type of measurement, i.e. an rms-measurement). It may be seen that a clear tip S has developed about in the range of 900 Hz which is responsible for the noise experienced in tests. Apart from this, there is yet another small elevation s in that range which is no longer perceptible.

Figure 6:
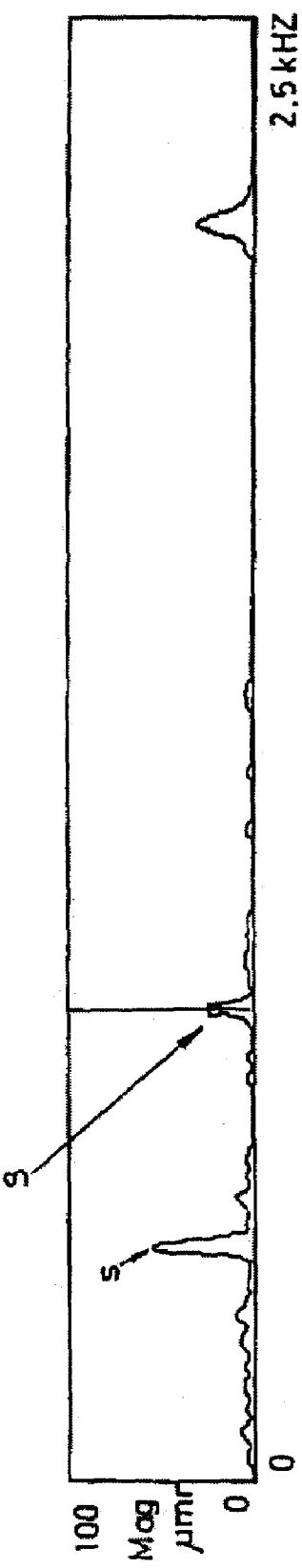
FIG. 6 a plot of an amplitude spectrum in an embodiment according to the invention, as shown in FIG. 2.

In contrast, FIG. 6 shows a similar plot which results from a design of the lubricating bores according to FIG. 2: the tip S appearing in the same range of frequency (about 900 Hz) has now become smaller, i.e. it has a clearly smaller amplitude. Although the originally small tip s has grown, this will not disturb, because it is in a frequency range which is not perceptible anyway.

One could now investigate the question, how the frequency ranges of FIGS. 5 and 6 do result, thus doing that first step of recognition according to the invention. This investigation should be tried with reference to the acceleration spectra (measurement of structure-borne noise or measurement of acceleration in g on the ordinate, while plotting the frequency in kHz on the abscissa) of FIGS. 7 and 8. In comparison to FIGS. 5 and 6, it will be seen that here also are the tips S and s. However, it is striking that there is still another tip s', in addition, which is situated in a lower frequency range. Although this tip s' increases with the embodiment of FIG. 2 according to the invention (FIG. 8), it does not have any effect in the frequency spectrum, as may be seen when comparing FIGS. 5 and 6. The reason was found to be that the tip s' is caused by the ignition frequency of the combustion engine, which was connected to the turbocharger and, therefore, has not to be taken into account.

Although the invention has been described above with reference to the preferred application in a turbocharger, those skilled in the art will understand that the invention can also be applied in other fluid flow engines, such as in secondary air pumps, and will result in substantially the same advantages. In any case, fluid flow engines comprising a turbine are especially critical as to development of noise due to the high numbers of revolution.

Furthermore, the bearing shell 34 must not necessarily be formed in one piece, as shown. It will also be understood that, although the lubricating bores 39 have been illustrated in FIGS. 2 to 4, but that similar or the same arrangements could, and will normally, be provided with the lubricating bores 38 (FIG. 1). Furthermore, it will be clear that the present invention can be used independently from the fact whether one turbine rotor is mounted on the shaft 18 or a plurality of them. This applies analogously to compressor rotors which can be present as one or more compressor wheel(s).

The invention claimed is:

1. A fluid flow engine comprising:
a shaft having a first end and an opposite second end;
a bearing housing for supporting said shaft;
a bearing shell in said bearing housing;
at least two lubricating bores in said bearing shell, said at least two lubricating bores having a predetermined geometry as to diameter, length and angular arrangement with respect to said bearing shell;
at least one turbine rotor on said first end of said shaft; and
a turbine housing having a turbine space for accommodating said at least one turbine rotor, said turbine housing being connected to said bearing housing;
wherein sound suppressing means is provided and arranged within said bearing housing.

2. The fluid flow engine as claimed in claim 1, further comprising at least one compressor rotor on said second end of said shaft, wherein said at least one turbine rotor and said at least one compressor rotor form part of a turbocharger.

3. The fluid flow engine as claimed in claim 1, wherein said sound suppressing means is a different geometry of the at least two lubricating bores.

4. The fluid flow engine as claimed in claim 3, wherein at least one of said at least two lubricating bores has a different diameter as compared with the diameter of another one of said at least two lubricating bores.

5. The fluid flow engine as claimed in claim 3, wherein at least one of said at least two lubricating bores has a different junction angle under which it orifices into said bearing shell as compared with another one of said at least two lubricating bores.

6. The fluid flow engine as claimed in claim 3, wherein said at least two lubricating bores discharge at different angular distances from one another into said bearing shell.

7. The fluid flow engine as claimed in claim 3, wherein at least one of said at least two lubricating bores has a different length as compared with another one of said at least two lubricating bores.

8. The fluid flow engine as claimed in claim 3, wherein the different geometry of the at least two lubricating bores is chosen from the group consisting essentially of the at least two lubricating bores having a different junction angle, the at least two lubricating bores being discharging at different angular distances, the at least two lubricating bores having a different length, and any combination thereof.

9. The fluid flow engine as claimed in claim 1, further comprising a helmholtz plate for suppressing sound.

10. The fluid flow engine as claimed in claim 1, further comprising sound absorbing material in the bearing housing.

* * * * *